(12) United States Patent
Richardson (10) Patent No.: US 11,639,678 B2
(45) Date of Patent: May 2, 2023

(54) TANK WITH INTEGRATED SIPHON (71) Applicant: Volvo Truck Corporation, Gothenburg (SE)

(72) Inventor: Benjamin Richardson, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/630,399

(22) PCT Filed: Sep. 5, 2019

(86) PCT No.: PCT/US2019/049690
§ 371 (c)(1),
(2) Date: Jan. 26, 2022

(87) PCT Pub. No.: WO2021/045761
PCT Pub. Date: Mar. 11, 2021

(65) Prior Publication Data
US 2022/0290597 A1 Sep. 15, 2022

(51) Int. Cl.
*F01N 3/20* (2006.01)
*B01D 53/94* (2006.01)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC ........ F01N 3/208; F01N 3/2066; F01N 3/206; F01N 2610/1413; F01N 2610/1426;
(Continued)

(56) References Cited

U.S. PATENT DOCUMENTS 9,248,390 B2 * 2/2016 Hudgens .............. B01D 29/117
9,605,574 B2 * 3/2017 Nihongi ............. G01N 33/0037
(Continued)

FOREIGN PATENT DOCUMENTS

CN 208918636 U 5/2019
DE 102008005196 A1 7/2009
(Continued)

OTHER PUBLICATIONS

International Search Report and Written Opinion for International Patent Application No. PCT/US2019/049690, dated Nov. 21, 2019, 11 pages.
(Continued)

*Primary Examiner* — Audrey B. Walter
*Assistant Examiner* — Dapinder Singh
(74) *Attorney, Agent, or Firm* — Withrow & Terranova, PLLC (57) ABSTRACT

Aspects of the disclosure relate to a diesel exhaust fluid tank for a vehicle. An exemplary diesel exhaust fluid tank includes a tank body to store diesel exhaust fluid, a tank supply line to deliver the diesel exhaust fluid to a Selective Catalytic Reduction (SCR) device, and a tank siphon line to drain the diesel exhaust fluid from the tank body. The tank siphon line is mounted to the tank body and includes a siphon inlet (e.g., devoid of a filter) at or proximate to a bottom wall of the tank body. The integrated tank siphon line avoids any need to remove tank components to feed a siphon tube into a tank. Further, the tank siphon line leverages preexisting components in the diesel exhaust fluid tank and/or the vehicle to siphon diesel exhaust fluid as needed.

20 Claims, 10 Drawing Sheets (52) U.S. Cl.
CPC ............... *F01N 2610/1413* (2013.01); *F01N 2610/1426* (2013.01); *F01N 2610/1433* (2013.01)

(58) Field of Classification Search
CPC ..... F01N 2610/1433; F01N 2610/1406; F01N 2610/142; F01N 2610/1473; F01N 2610/14; F01N 2610/10; F01N 2610/02; F01N 2610/1486; F01N 2550/05; F01N 2240/25; B01D 53/9418; B01D 53/9431; Y02T 10/12; Y02T 10/40
See application file for complete search history.

(56) References Cited

U.S. PATENT DOCUMENTS

| | | |
|---|---|---|
| 2015/0377112 A1 | 12/2015 | Ogawa et al. |
| 2016/0251130 A1 | 9/2016 | Horikawa et al. |
| 2021/0020764 A1 | 1/2021 | Takatani |
| 2021/0220764 A1* | 7/2021 | Azuma ................... E02F 9/00 |

FOREIGN PATENT DOCUMENTS

| | | |
|---|---|---|
| EP | 3051083 A1 | 8/2016 |
| WO | 2018074624 A1 | 4/2018 |

OTHER PUBLICATIONS

International Preliminary Report on Patentability for International Patent Application No. PCT/US2019/049690, dated Aug. 12, 2021, 14 pages.
Extended European Search Report for European Patent Application No. 19944582.6, dated Mar. 14, 2023, 8 pages.

* cited by examiner

TANK WITH INTEGRATED SIPHON

This application is a 35 USC 371 national phase filing of International Application No. PCT/US2019/049690, filed Sep. 5, 2019, the disclosure of which is incorporated herein by reference in its entirety.

FIELD OF THE DISCLOSURE

The disclosure relates generally to tanks for trucking vehicles. In particular aspects, the disclosure relates to a diesel exhaust fluid tank with an integrated siphon.

BACKGROUND

Diesel Exhaust Fluid (DEF), commonly referred to as AdBlue in Europe, is an aqueous urea solution of 32.5% high-purity urea and 67.5% deionized water. DEF is consumed as a reactant in selective catalytic reduction (SCR) systems to lower the nitrogen oxides (NOx) content in the diesel exhaust emissions from diesel engines. DEF is typically carried on the vehicle in a DEF tank (i.e., supply tank), and a dosing apparatus draws DEF from the tank and injects it into the exhaust upstream of an SCR catalyst. The urea is converted via thermolysis and hydrolysis into ammonia. Inside the SCR catalyst body, the ammonia then reduces the NOx into water and nitrogen.

In certain situations, the DEF tank may need to be drained. Some DEF tanks include a drain plug in a bottom of the DEF tank. However, such a design may be restrictive or impractical in certain applications, such as where the bottom of the DEF tank is not accessible. An alternative is to simply feed a siphoning tube into the DEF tank. However, doing so requires removal of components of the DEF tank, which can be cumbersome. Further, such a configuration may require carrying additional components dedicated to draining (e.g., a siphoning tube), which may not always be available (e.g., because of the infrequency with which the component may be used).

SUMMARY

Aspects of the disclosure relate to a diesel exhaust fluid tank for a vehicle. An exemplary diesel exhaust fluid tank includes a tank body to store diesel exhaust fluid (e.g., urea), a tank supply line to deliver the diesel exhaust fluid to a Selective Catalytic Reduction (SCR) device, and a tank siphon line to drain the diesel exhaust fluid from the tank body. The diesel exhaust fluid tank further includes a fill port, a tank supply port of the tank supply line, and a tank siphon port of the tank siphon line, which are all at or proximate to a top wall of the tank body. The tank siphon line is mounted to the tank body and includes a siphon inlet (e.g., devoid of a filter) at or proximate to a bottom wall of the tank body. The integrated tank siphon line avoids any need to remove tank components to feed a siphon tube into a tank. Further, the tank siphon line leverages preexisting components in the diesel exhaust fluid tank and/or the vehicle to siphon as needed.

In one aspect, a diesel exhaust fluid tank includes a tank body, a fill port, a tank supply line, and a tank siphon line. The tank body is configured to store diesel exhaust fluid, includes a top wall, a bottom wall, and at least one sidewall therebetween, and defines a tank interior and a tank exterior. The fill port is at or proximate to the top wall of the tank body. The fill port is in fluid communication with the tank interior of the tank body. The tank supply line is mounted to the tank body and extends from the tank interior to the tank exterior. The tank supply line includes a tank supply port at or proximate to the top wall of the tank body. The tank supply port includes a supply connection interface configured to connect to a pump supply line to deliver the diesel exhaust fluid to an SCR device. The tank supply line includes a supply inlet at or proximate to the bottom wall of the tank body. The tank siphon line is mounted to the tank body and extends from the tank interior to the tank exterior. The tank siphon line includes a tank siphon port at or proximate to the top wall of the tank body. The tank siphon port includes a siphon connection interface. The tank siphon line is configured to drain the diesel exhaust fluid from the tank body. The tank siphon line includes a siphon inlet at or proximate to the bottom wall of the tank body.

In certain embodiments, the tank siphon line in a draining configuration is configured to drain the diesel exhaust fluid from the tank body, and in a delivery configuration is configured to connect to a pump return line for returning the diesel exhaust fluid undelivered to the SCR device.

In certain embodiments, the diesel exhaust fluid tank includes a tank return line mounted to the tank body and extending from the tank interior to the tank exterior. The tank return line includes a tank return port at or proximate to the top wall of the tank body. The tank return port includes a return connection interface configured to connect to a pump return line for returning the diesel exhaust fluid undelivered to the SCR device.

In certain embodiments, the siphon connection interface has a same configuration as the supply connection interface for interchangeable attachment of the pump supply line.

In certain embodiments, the tank siphon line is devoid of a valve.

In certain embodiments, the tank siphon line is devoid of a filter.

In certain embodiments, the diesel exhaust fluid tank includes an internal filter positioned within the tank interior of the tank body. The internal filter is in fluid communication with the tank supply line.

In certain embodiments, the diesel exhaust fluid tank includes a flow port and a sending unit. The flow port is at or proximate to the top wall of the tank body. The flow port is in fluid communication with the tank interior of the tank body. The sending unit includes a sending interface configured to removably attach to the flow port, the tank supply line permanently mounted to and extending through the sending interface, and the internal filter attached to the tank supply line.

In certain embodiments, the sending unit further includes the tank siphon line permanently mounted to and extending through the sending interface.

In certain embodiments, the tank siphon line is permanently mounted to the tank body and extends through the top wall or the at least one sidewall of the tank body.

In certain embodiments, the tank body is devoid of a drain plug at or proximate to the bottom wall of the tank body.

In another aspect, a vehicle includes an SCR device, a pump supply line in fluid communication with the SCR device, a pump return line in fluid communication with the pump supply line, and a diesel exhaust fluid tank. The diesel exhaust fluid tank includes a tank body, a fill port, a tank supply line, and a tank siphon line. The tank body is configured to store diesel exhaust fluid. The tank body includes a top wall, a bottom wall, and at least one sidewall therebetween. The tank body defines a tank interior and a tank exterior. The fill port is at or proximate to the top wall of the tank body. The fill port is in fluid communication with the tank interior of the tank body. The tank supply line is mounted to the tank body and extending from the tank interior to the tank exterior. The tank supply line includes a tank supply port at or proximate to the top wall of the tank body. The tank supply port includes a supply connection interface configured to connect to the pump supply line to deliver the diesel exhaust fluid to the SCR device. The tank supply line includes a supply inlet at or proximate to the bottom wall of the tank body. The tank siphon line is mounted to the tank body and extends from the tank interior to the tank exterior. The tank siphon line includes a tank siphon port at or proximate to the top wall of the tank body. The tank siphon port includes a siphon connection interface. The tank siphon line is configured to drain the diesel exhaust fluid from the tank body. The tank siphon line includes a siphon inlet at or proximate to the bottom wall of the tank body.

In certain embodiments, the tank siphon line in a draining configuration is configured to drain the diesel exhaust fluid from the tank body, and in a delivery configuration is configured to connect to the pump return line for returning the diesel exhaust fluid undelivered to the SCR device.

In certain embodiments, the diesel exhaust fluid tank further includes a tank return line mounted to the tank body and extending from the tank interior to the tank exterior. The tank return line includes a tank return port at or proximate to the top wall of the tank body. The tank return port includes a return connection interface configured to connect to the pump return line for returning the diesel exhaust fluid undelivered to the SCR device.

In certain embodiments, the pump supply line is configured to be removed from fluid communication with the SCR device and the supply connection interface of the tank body, and configured to be attached to the siphon connection interface and a pump for draining the diesel exhaust fluid from the tank body. The pump return line is configured to be removed from fluid communication with the SCR device and the return connection interface of the tank body, and configured to be attached to the siphon connection interface and the pump for draining the diesel exhaust fluid from the tank body.

In another aspect, a method of forming a diesel exhaust fluid tank includes forming a tank body configured to store diesel exhaust fluid. The tank body includes a top wall, a bottom wall, and at least one sidewall therebetween. The tank body defines a tank interior and a tank exterior. The method further includes forming a fill port at or proximate to the top wall of the tank body. The fill port is in fluid communication with the tank interior of the tank body. The method further includes mounting a tank supply line to the tank body to extend from the tank interior to the tank exterior. The tank supply line includes a tank supply port at or proximate to the top wall of the tank body. The tank supply port includes a supply connection interface configured to connect to a pump supply line to deliver the diesel exhaust fluid to an SCR device. The tank supply line includes a supply inlet at or proximate to the bottom wall of the tank body. The method further includes mounting a tank siphon line to the tank body to extend from the tank interior to the tank exterior. The tank siphon line includes a tank siphon port at or proximate to the top wall of the tank body. The tank siphon port includes a siphon connection interface. The tank siphon line is configured to drain the diesel exhaust fluid from the tank body. The tank siphon line includes a siphon inlet at or proximate to the bottom wall of the tank body.

In certain embodiments, the tank siphon line in a draining configuration is configured to drain the diesel exhaust fluid from the tank body, and in a delivery configuration is configured to connect to a pump return line for returning the diesel exhaust fluid undelivered to the SCR device.

In certain embodiments the method further includes mounting a tank return line to the tank body to extend from the tank interior to the tank exterior. The tank return line includes a tank return port at or proximate to the top wall of the tank body. The tank return port includes a return connection interface configured to connect to a pump return line for returning the diesel exhaust fluid undelivered to the SCR device.

In certain embodiments, the siphon connection interface has a same configuration as the supply connection interface for interchangeable attachment of the pump supply line.

In certain embodiments, the method further includes positioning an internal filter within the tank interior of the tank body. The internal filter is in fluid communication with the tank supply line. The tank siphon line is devoid of a filter.

In certain embodiments, the method further includes forming a flow port at or proximate to the top wall of the tank body. The flow port is in fluid communication with the tank interior of the tank body. The method further includes forming a sending unit. The sending unit includes a sending interface configured to removably attach to the flow port, the tank supply line permanently mounted to and extending through the sending interface, the tank siphon line permanently mounted to and extending through the sending interface, and the internal filter permanently attached to the tank supply line. The method further includes attaching the sending unit to the flow port.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1A:
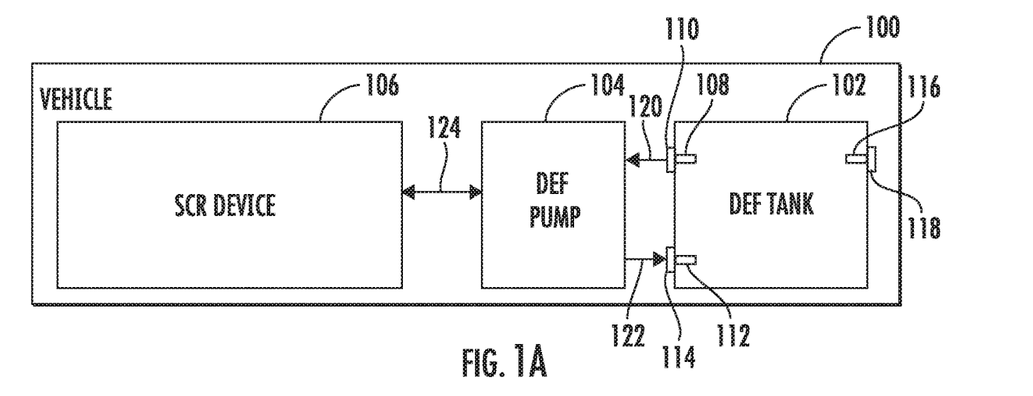
FIG. 1A is a diagram of a vehicle including a diesel exhaust fluid (DEF) tank in a delivery configuration to deliver DEF through a DEF pump to a Selective Catalytic Reduction (SCR) device.

FIG. 1A is a diagram of a vehicle 100 including a diesel exhaust fluid (DEF) tank 102 in a delivery configuration to deliver DEF through a DEF pump 104 to a Selective Catalytic Reduction (SCR) device 106. The DEF tank 102 includes a tank supply line 108 (which may also be referred to herein as a supply line) with a tank supply port 110 (which may also be referred to herein as a supply port), a tank return line 112 (which may also be referred to herein as a return line) with a tank return port 114 (which may also be referred to herein as a return port), and a tank siphon line 116 (which may also be referred to herein as a siphon line) with a tank siphon port 118 (which may also be referred to herein as a siphon port). The vehicle 100 includes a pump supply line 120 (which may also be referred to as a dosing supply line) in fluid communication with the tank supply port 110 of the DEF tank 102 and the DEF pump 104, and a pump return line 122 (which may also be referred to herein as a dosing return line) in fluid communication with the tank return port 114 of the DEF tank 102 and the DEF pump 104. In other words, the pump supply line 120 is in fluid communication with the SCR device 106. Further, the pump return line 122 is in fluid communication with the pump supply line 120. The vehicle 100 further includes a pump delivery line 124 (which may also be referred to herein as a dosing delivery line) in fluid communication with the DEF pump 104 and the SCR device 106.

The DEF pump 104 draws DEF from the DEF tank 102 through the tank supply port 110 to the pump supply line 120 to the DEF pump 104, which then delivers the DEF through the pump delivery line 124 to the SCR device 106. Any DEF drawn by the DEF pump 104 that was undelivered to the SCR device 106 is returned to the DEF tank 102 through the pump return line 122 to the tank return port 114 to the DEF tank 102.

Figure 1B:
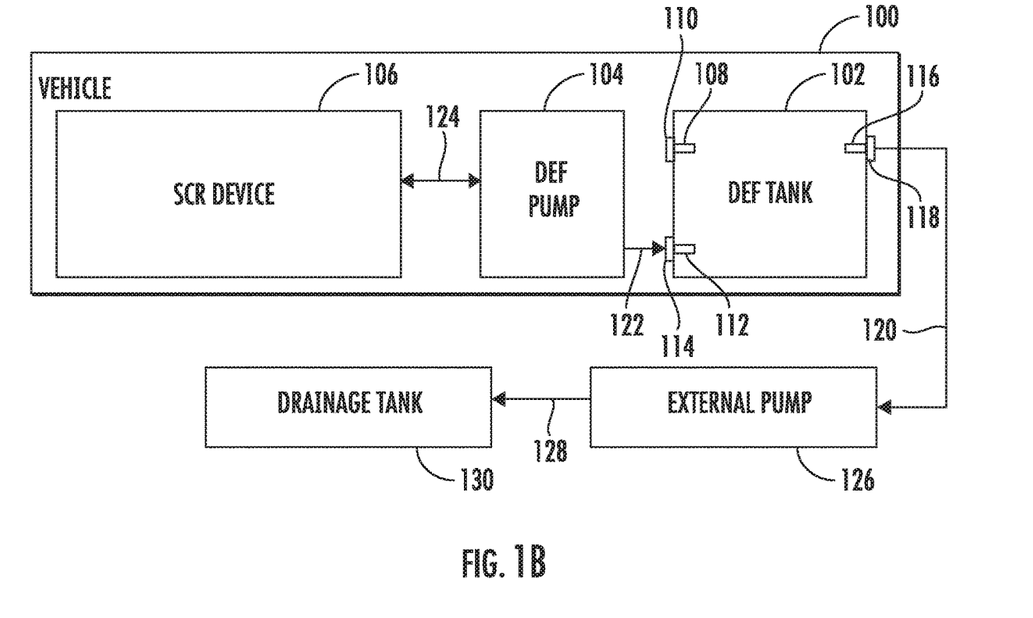
FIG. 1B is a diagram of the vehicle of FIG. 1A including the DEF tank in a draining configuration to drain DEF from the DEF tank through an external pump to a drainage tank.

FIG. 1B is a diagram of the vehicle 100 of FIG. 1A including the DEF tank 102 in a draining configuration to drain DEF from the DEF tank 102 through an external pump 126 (may also be referred to as a draining pump) to a drainage tank 130. In this configuration, the pump supply line 120 is detached from the tank supply port 110 and the DEF pump 104 and reattached to the tank siphon port 118 and the external pump 126. In other words, the pump supply line 120 is configured to be removed from fluid communication with the SCR device 106 and a supply connection interface of the tank supply port 110 of the DEF tank 102, and configured to be attached to a siphon connection interface of the tank siphon port 118 of the DEF tank 102 and an external pump 126 for draining the DEF from the DEF tank 102. Accordingly, the external pump 126 draws DEF from the DEF tank 102 through the tank siphon port 118 to the pump supply line 120, which then delivers the DEF through an external pump delivery line 128 to the drainage tank 130. The supply connection interface of the tank supply port 110 is the same as the siphon connection interface of the tank siphon port 118. Thus, the DEF tank 102 leverages preexisting components in the DEF tank 102 and/or the vehicle 100 to siphon DEF as needed.

In certain embodiments, the pump return line 122 is configured to be removed from fluid communication with the SCR device 106 and a return connection interface of the tank return port 114 of the DEF tank 102, and configured to be attached to a siphon connection interface of the tank siphon port 118 of the DEF tank 102 and the external pump 126 for draining the DEF from the DEF tank 102. The return connection interface of the tank return port 114 is the same as the siphon connection interface of the tank siphon port 118.

Figure 2:
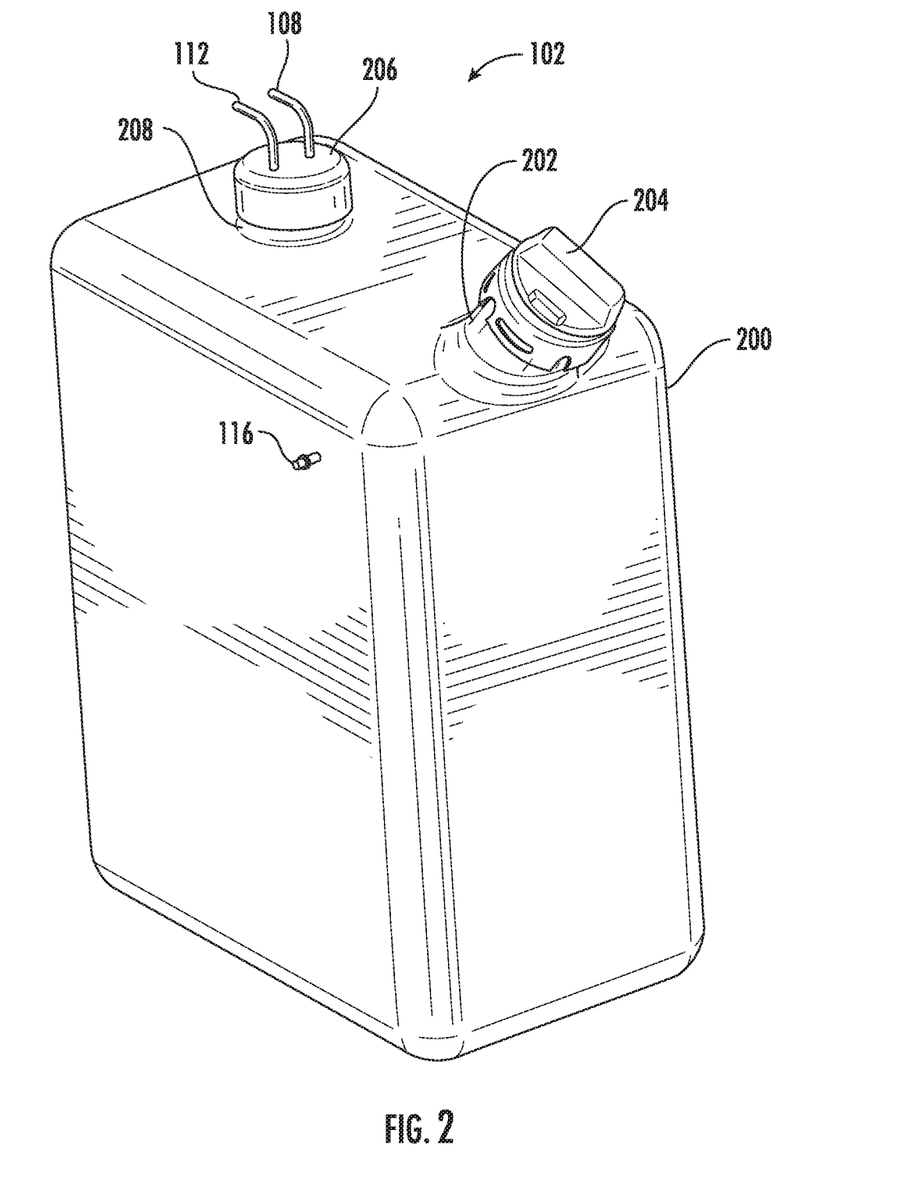
FIG. 2 is a perspective view of the DEF tank of FIGS. 1A and 1B.

FIG. 2 is a perspective view of the DEF tank 102 of FIGS. 1A and 1B. The DEF tank 102 includes a tank body 200, a fill cap 204, a sending unit 206, and a tank siphon line 116. The tank body 200 is configured to store DEF. The tank body 200 includes a fill port 202 with the fill cap 204 removably attachable to the fill port 202. The fill port 202 is configured to receive a portion of a fill pump to fill up the tank body 200 with DEF. The tank body 200 further includes a flow port 208 with the sending unit 206 removably attachable to the flow port 208. The sending unit 206 includes a tank supply line 108 and a tank return line 112. The tank supply line 108 is configured to attach to the pump supply line 120 of FIGS. 1A and 1B to deliver DEF to the SCR device 106. The tank return line 112 is configured to attach to the pump return line 122 of FIGS. 1A and 1B to return DEF undelivered to the SCR device 106.

The tank siphon line 116 is permanently mounted in the tank body 200 to drain DEF from the tank body 200. The integrated tank siphon line 116 avoids any need to remove tank components to feed a siphon tube into the DEF tank 102. Further, the tank siphon line 116 leverages preexisting components integrated into the DEF tank 102 and/or the vehicle 100 to siphon as needed. For example, as discussed above, the pump supply line 120 can be detached from the tank supply line 108 and attached to the tank siphon line 116. In this way, existing components of the DEF tank 102 and/or the vehicle 100 can be rearranged for multiple purposes.

Figure 3:
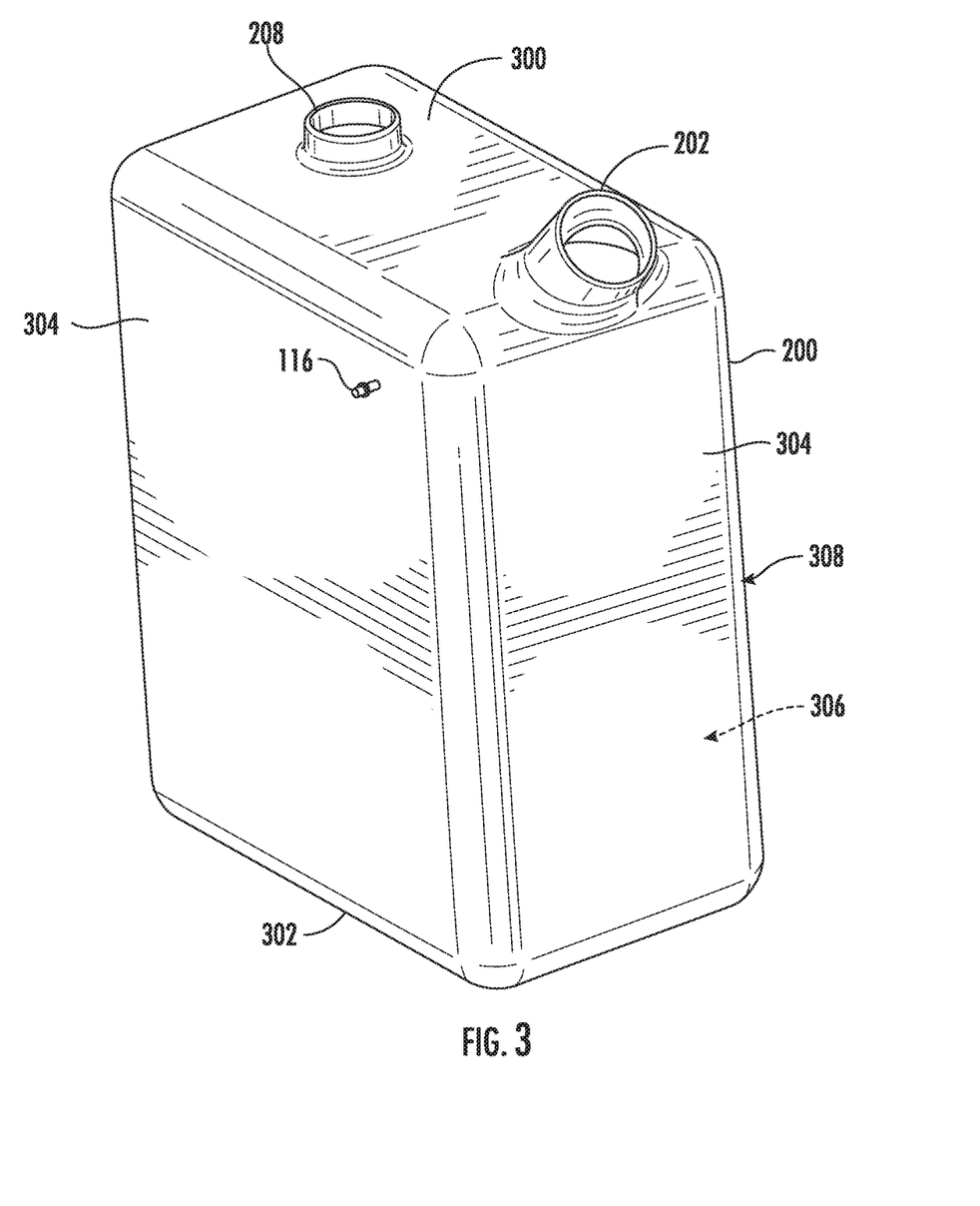
FIG. 3 is a perspective view of a tank body of the DEF tank of FIG. 2.

FIG. 3 is a perspective view of the tank body 200 of the DEF tank 102 of FIG. 2. The tank body 200 includes a top wall 300, a bottom wall 302, and one or more sidewalls 304 therebetween. The tank body 200 defines a tank interior 306 and a tank exterior 308. The fill port 202 is at or proximate to the top wall 300 of the tank body 200. The fill port 202 is in fluid communication with the tank interior 306 of the tank body 200. The flow port 208 is also at or proximate to the top wall 300 of the tank body 200. The flow port 208 is in fluid communication with the tank interior 306 of the tank body 200. In certain embodiments, the tank body 200 is devoid of a drain plug at or proximate to the bottom wall 302 of the tank body 200. For example, in certain vehicle designs it may not be possible to access a bottom of the tank body 200 in which case a drain plug can be omitted (e.g., to reduce manufacturing costs).

Figure 4:
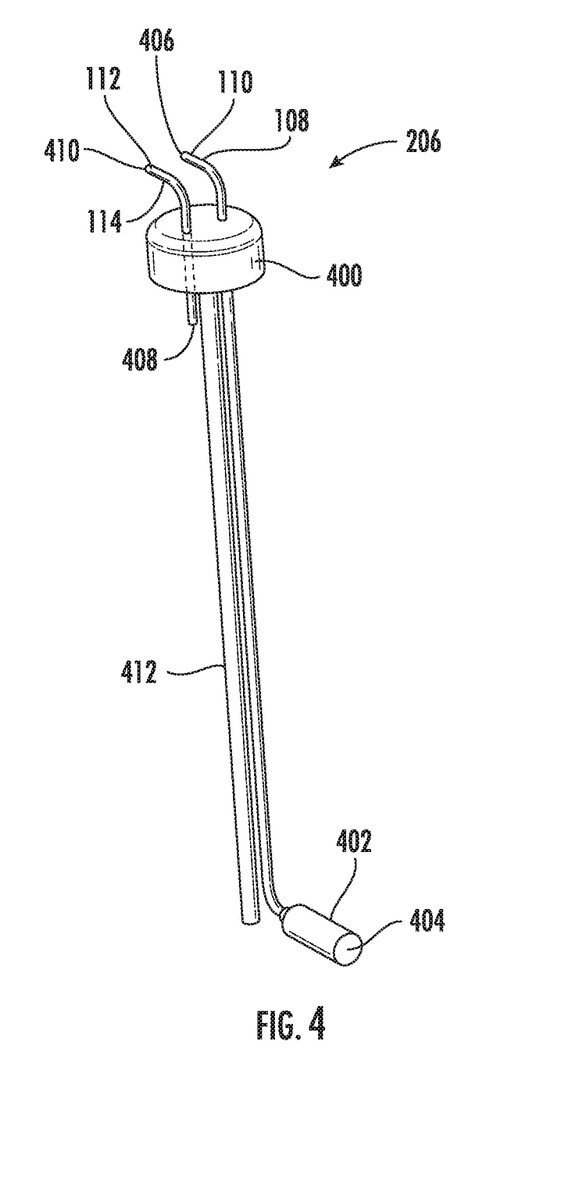
FIG. 4 is a perspective view of a sending unit of the DEF tank of FIG. 2.

FIG. 4 is a perspective view of the sending unit 206 of the DEF tank 102 of FIG. 2. The sending unit 206 includes a sending interface 400 (e.g., sending cap) configured to removably attach to the flow port 208, the tank supply line 108 permanently mounted to and extending through the sending interface 400, and an internal filter 402 attached to the tank supply line 108. The tank supply line 108 includes a tank supply port 110 at one end and a supply inlet 404 at an opposite end. In particular, the tank supply port 110 is proximate one side of the sending interface 400 (e.g., at a top of the sending interface 400), and the supply inlet 404 is proximate an opposite side of the sending interface 400. The tank supply port 110 includes a supply connection interface 406 configured to connect to the pump supply line 120 to deliver the DEF to the SCR device 106. The internal filter 402 is attached to the tank supply line 108 proximate the supply inlet 404 and is in fluid communication with the tank supply line 108.

The sending unit 206 further includes the tank return line 112 permanently mounted and extending through the sending interface 400. The tank return line 112 includes the tank return port 114 at one end and a return outlet 408 at an opposite end. In particular, the tank return port 114 is proximate one side of the sending interface 400 (e.g., at a top of the sending interface 400), and the return outlet 408 is proximate an opposite side of the sending interface 400. The tank return port 114 includes a return connection interface 410 configured to connect to the pump return line 122 for returning the DEF undelivered to the SCR device 106.

The sending unit 206 further includes a sensor 412. In certain embodiments, the sensor 412 includes a level sensor, temperature sensor, and/or a fuel quality sensor (e.g., measuring fuel concentration of one or more constituents of the DEF), etc. In certain embodiments, the sending unit 206 further includes a heating element that extends into the tank interior 306 of the tank body 200.

Figure 5:
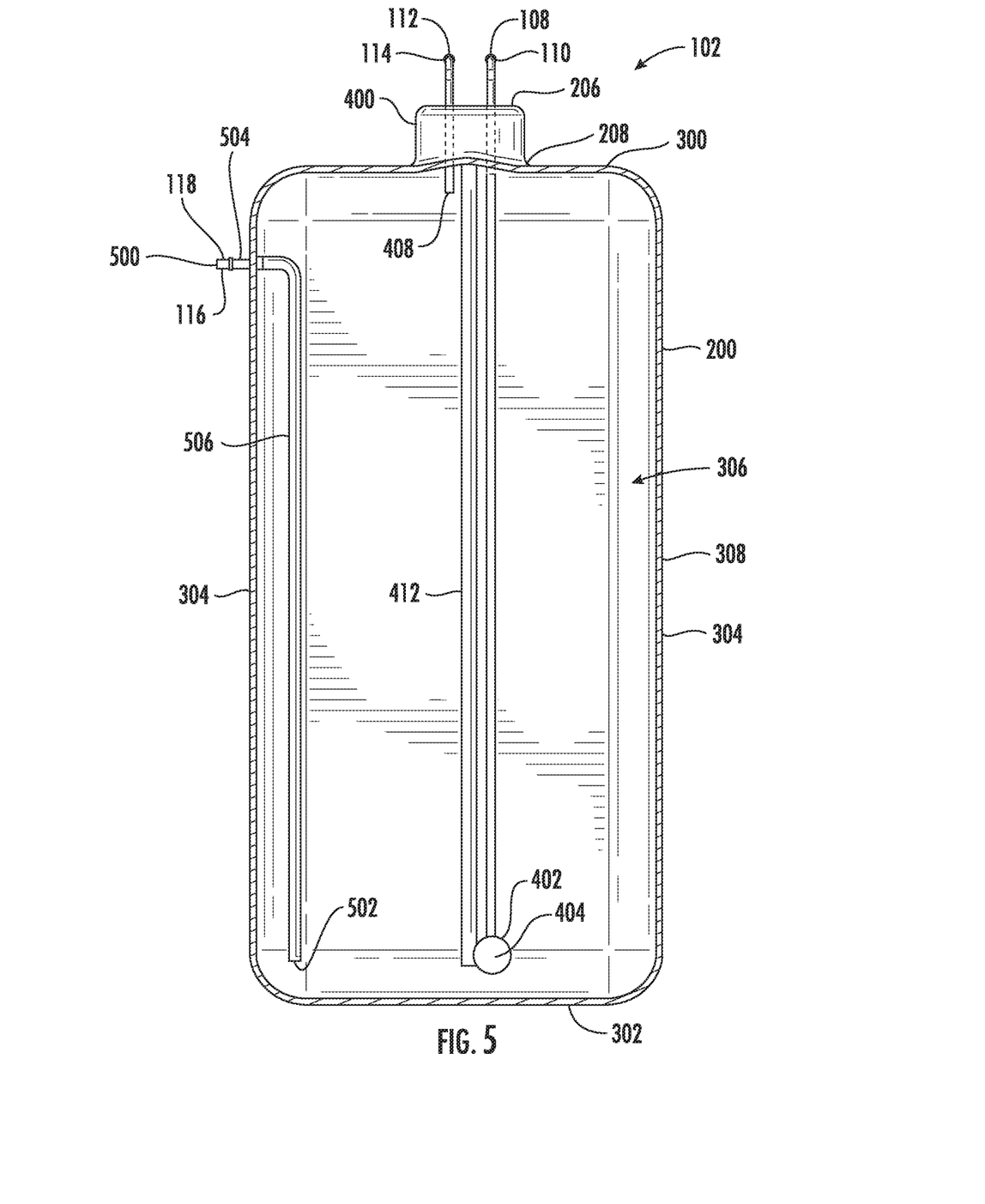
FIG. 5 is a cross-sectional side view of the DEF tank of FIG. 2 illustrating the sending unit and a tank siphon line mounted to the tank body.

FIG. 5 is a cross-sectional side view of the DEF tank 102 of FIG. 2 illustrating the sending unit 206 and the tank siphon line 116 mounted to the tank body 200. The sending unit 206 is removably attached to the flow port 208 with the supply inlet 404, internal filter 402, return outlet 408, and sensor 412 (which may also be referred to as a probe) positioned within the tank body 200. Accordingly, the tank supply line 108, the tank return line 112, and the tank siphon line 116 are mounted to the tank body 200 and extend from the tank interior 306 to the tank exterior 308.

The tank supply line 108 includes the tank supply port 110 at or proximate to the top wall 300 of the tank body 200. The tank supply line 108 includes the supply inlet 404 at or proximate to the bottom wall 302 of the tank body 200. However, the tank supply line 108 is not suitable for use for draining because of inclusion of the internal filter 402. For example, using the tank supply line 108 as a siphoning tube may present a design vulnerability as the DEF tank 102 may need to be drained because of a problem with the internal filter 402 (e.g., the internal filter 402 or tank supply line 108 is clogged).

The tank return line 112 includes the tank return port 114 at or proximate to the top wall 300 of the tank body 200. The tank return line 112 includes the return outlet 408 at or proximate to the top wall 300 of the tank body 200. In other words, a length of the tank return line 112 is shorter than the tank supply line 108. As a result, the tank return line 112 is not suitable for draining because the return outlet 408 is generally in the headspace above the DEF and cannot draw DEF out from the tank body 200.

The tank siphon line 116 is permanently mounted to the tank body 200 and extends through the sidewall 304 of the tank body 200. In certain embodiments, the tank siphon line 116 extends through the top wall 300 of the tank body 200. The tank siphon line 116 includes the tank siphon port 118 with a siphon connection interface 500 at or proximate to the top wall 300 of the tank body 200. The tank siphon port 118 may be male or female. In certain embodiments, the siphon connection interface 500 has a same configuration as the supply connection interface 406 for interchangeable attachment of the pump supply line 120 and/or the same configuration as the return connection interface 410 for interchangeable attachment of the pump return line 122.

The tank siphon line 116 includes a siphon inlet 502 at or proximate to the bottom wall 302 of the tank body 200. Accordingly, the tank siphon line 116 is configured to drain the DEF from the tank body 200. In certain embodiments, the tank siphon line 116 is devoid of a valve and/or a filter, which facilitates draining of the DEF tank 102, reduces the cost of the tank siphon line 116 (and as a result the DEF tank 102), and/or avoids design vulnerabilities, etc. Such a configuration may be advantageous where the DEF tank 102 cannot be drained from the bottom, such as because of a lack of access or because there are vehicle components positioned beneath the DEF tank 102.

In certain embodiments, the tank siphon line 116 includes a first portion 504 extending through the sidewall 304 of the tank body 200, and a second portion 506 (which may also be referred to herein as a pick up tube, pick up tubing, etc.) attached to the first portion 504. In other embodiments, the tank siphon line 116 is a unitary construction (e.g., metal, plastic, etc.). In particular, in certain embodiments, the first portion 504 includes a rigid material (e.g., metal), such as to facilitate mounting to the sidewall 304 of the tank body 200. For example, in certain embodiments, the first portion 504 is overmolded into the tank body 200. The first portion 504 could be linear or at a right angle. In certain embodiments, the second portion 506 includes a flexible material (e.g., rubber) or rigid material that extends from or proximate the top wall 300 of the tank body 200 to proximate the bottom wall 302 of the tank body 200. In certain embodiments, the second portion 506 is fit over a section of the first portion 504.

Figure 6:
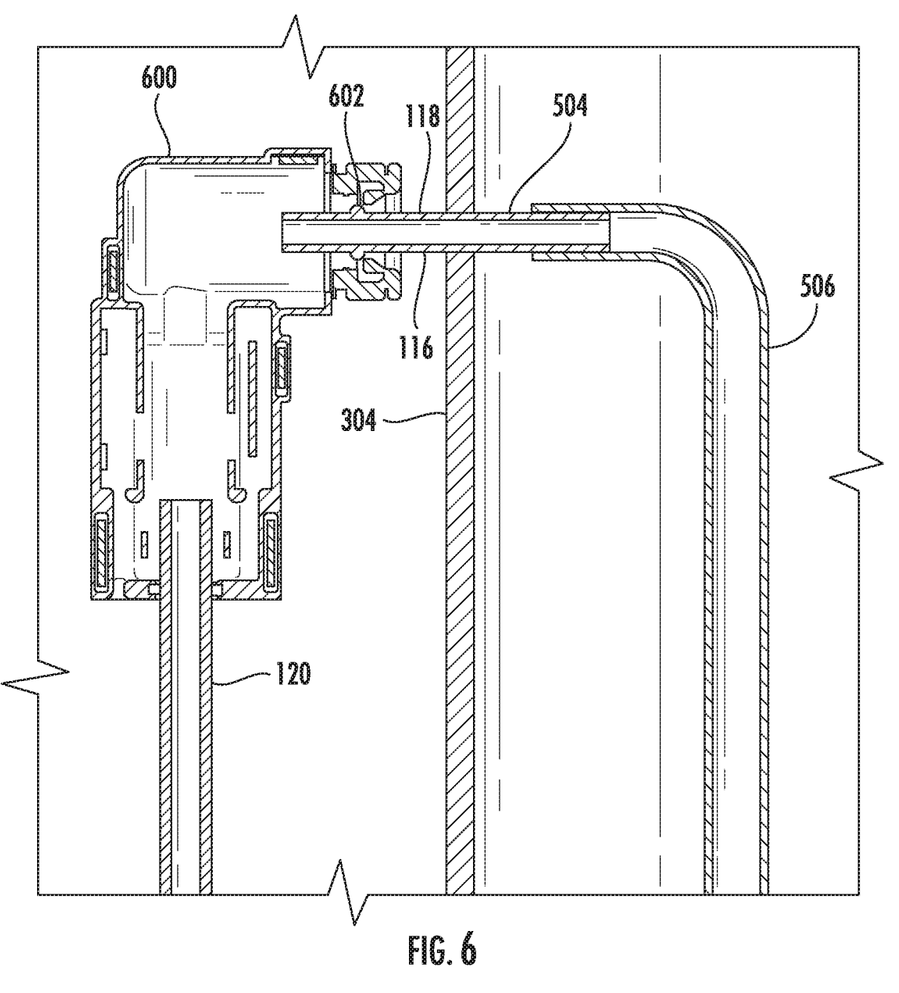
FIG. 6 is a cross-sectional close up side view of a quick connect clamp attached to a tank siphon port of the tank siphon line of the DEF tank of FIG. 2.

FIG. 6 is a cross-sectional close up side view of a quick connect clamp 600 attached to a tank siphon port 118 of the tank siphon line 116 of the DEF tank 102 of FIG. 2. In particular, the quick connect clamp 600 is attached to the pump supply line 120. As noted above, the supply connection interface 406 of the tank supply port 110 of the tank supply line 108 is the same as that of the siphon connection interface 500 of the tank siphon port 118 of the tank siphon line 116. Accordingly, to put the DEF tank 102 in a draining configuration, the quick connect clamp 600 is removed from connection to the tank supply port 110 of the tank supply line 108 and attached to the tank siphon port 118 of the tank siphon line 116 to form a seal 602 between the quick connect clamp 600 and the tank siphon port 118.

Although the quick connect clamp 600 is attached to the pump supply line 120, the quick connect clamp 600 could similarly be attached to the pump return line 122. It is further noted that other types of connections could be used. For example, the tank siphon port 118 could be male or female. The tubing of the pump supply line 120 and/or the pump return line 122 could be configured to fit over the tank siphon port 118 of the tank siphon line 116.

Figure 7:
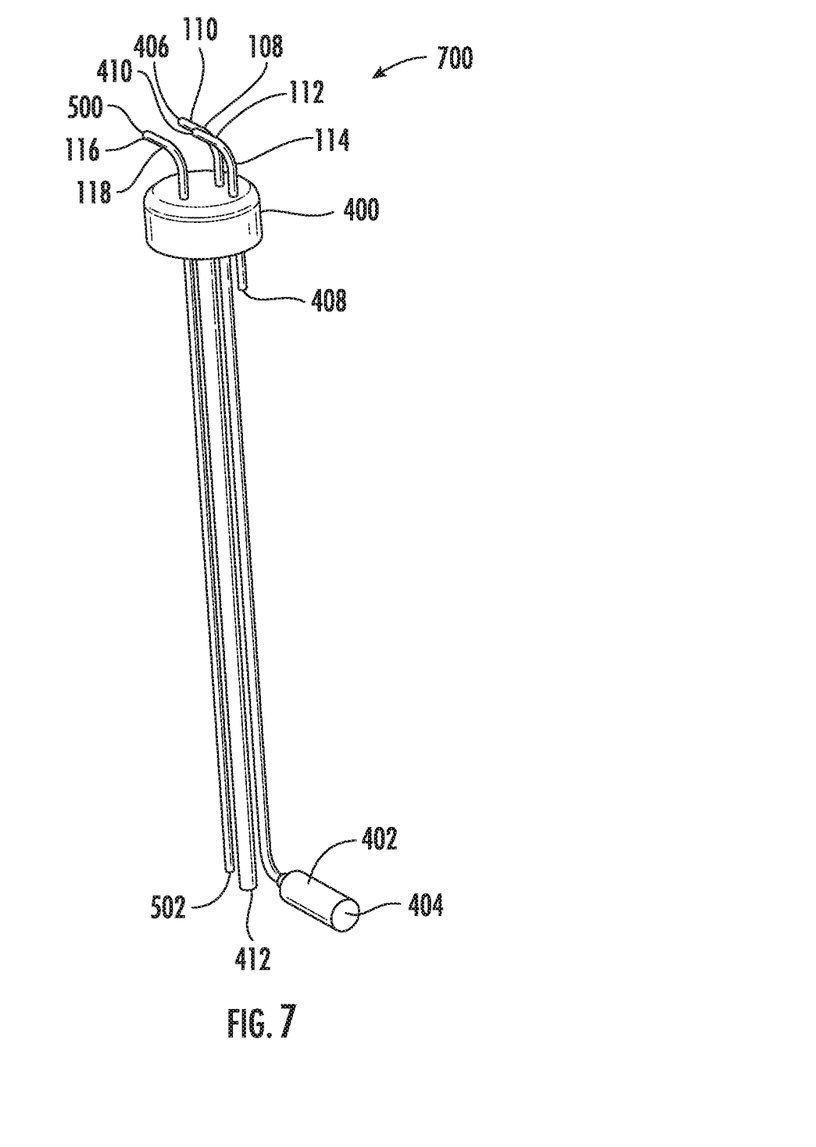
FIG. 7 is a perspective view of another embodiment of a sending unit including a tank siphon line mounted to a sending interface of the sending unit.

FIG. 7 is a perspective view of another embodiment of a sending unit 700 including a tank siphon line 116 mounted to a sending interface 400 of the sending unit 700. The sending unit 700 includes the same features and functionality as that of the sending unit 206 of FIG. 4 except where otherwise noted. In particular, the sending unit 700 includes the tank siphon line 116 permanently mounted to and extending through the sending interface 400. The tank siphon line 116 has a length similar to that of the tank supply line 108 and longer than the tank return line 112. Accordingly, as similarly discussed above, the siphon inlet 502 is proximate a bottom wall 302 of the tank body 200 when the sending unit 700 is mounted to the flow port 208 of the tank body 200. In such a configuration, the tank siphon line 116 extends through the top wall 300 of the tank body 200. Such a configuration may be easier to manufacture than including the tank siphon line 116 in the tank body 200.

Figure 8:
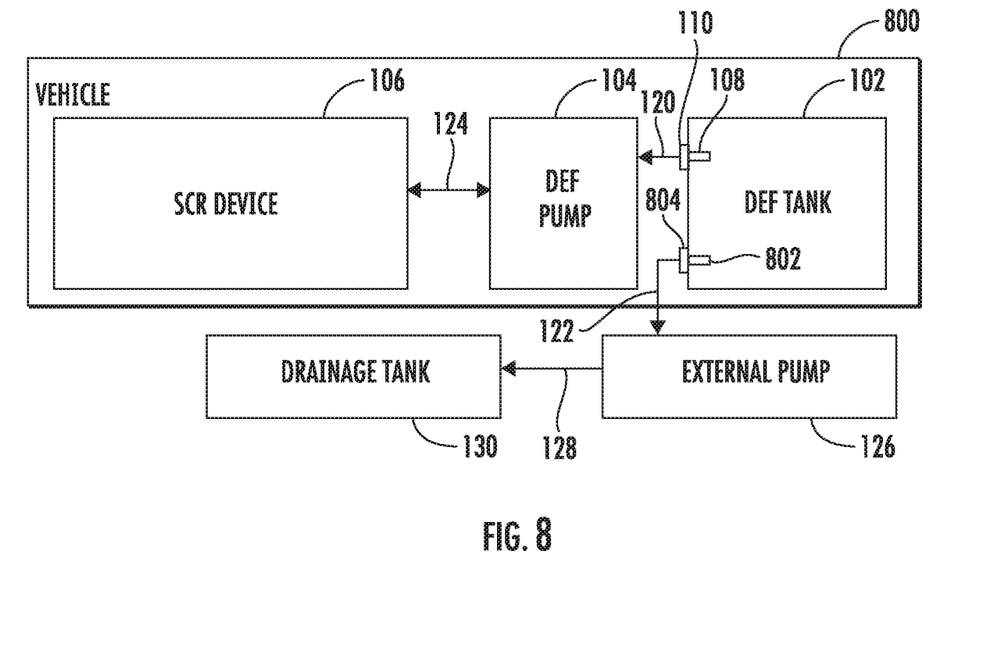
FIG. 8 is a diagram of another embodiment of a vehicle illustrating using a convertible line which can be used as a tank return line or a tank siphon line depending on the configuration.

FIG. 8 is a diagram of another embodiment of a vehicle 800 illustrating using a convertible line 802 with a convertible port 804 which can be used as a tank return line or a tank siphon line depending on the configuration. The vehicle includes the same features and functionality as that of the vehicle of FIGS. 1A and 1B except where otherwise noted. In particular, the convertible line 802 in a delivery configuration (see, e.g., FIG. 1A) acts as a tank return line and is configured to connect to a pump return line 122 for returning the DEF undelivered to the SCR device 106. The convertible line 802 in a draining configuration (see, e.g., FIG. 8) operates as a tank siphon line and is configured to drain the DEF from the tank body 200. To change the convertible port 804 from the delivery configuration to the draining configuration, the pump return line 122 is detached from the DEF pump 104 and reattached to the external pump 126. Accordingly, the external pump 126 draws DEF from the DEF tank 102 through the convertible line 802 to the pump return line 122, which then delivers the DEF through the external pump delivery line 128 to the drainage tank 130.

Figure 9:
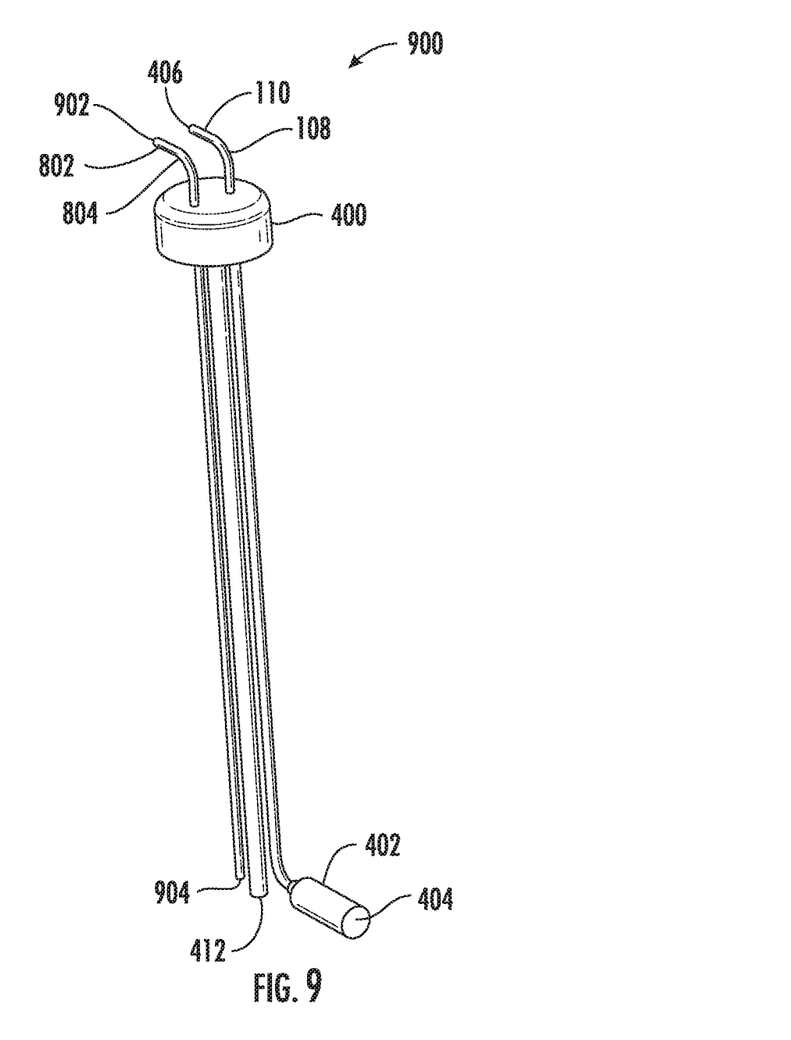
FIG. 9 is a perspective view of another embodiment of the sending unit using the convertible line of FIG. 8.

FIG. 9 is a perspective view of another embodiment of a sending unit 900 using the convertible line 802 of FIG. 8. The sending unit 900 includes the same features and functionality as that of the sending unit 206 of FIG. 4 and/or the sending unit 700 of FIG. 7 except where otherwise noted. The convertible line 802 is similar to the tank siphon line 116 discussed above. In particular, the sending unit 700 includes a convertible line 802 with a connection interface 902 at one end and a siphon inlet 904 at an opposite end. The convertible line 802 has a length similar to that of the tank supply line 108. The convertible line 802 is configured for placement of the siphon inlet 904 proximate the bottom wall 302 of the tank body 200. Accordingly, as similarly discussed above, the siphon inlet 904 is proximate a bottom wall 302 of the tank body 200 when the sending unit 900 is mounted to the flow port 208 of the tank body 200. In such a configuration, the convertible line 802 extends through the top wall 300 of the tank body 200. Such a configuration may be easier to manufacture than including the tank siphon line 116 in the tank body 200, and is easier to manufacture than the sending unit 700 of FIG. 7 as the tank return line 112 is omitted entirely. Further, such a configuration may be easier to use as only the end of the pump return line 122 attached to the DEF pump 104 is to be removed and attached to the external pump 126.

In certain configurations, a filter may be provided external to the DEF tank 102, but such configurations may be very expensive and potentially cost prohibitive.

Figure 10:
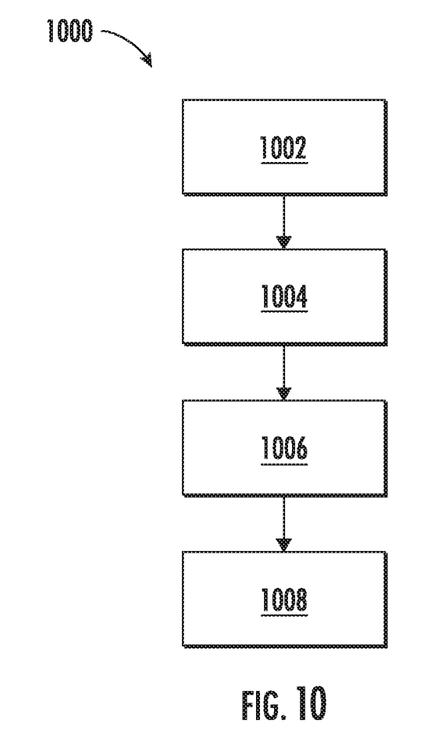
FIG. 10 is a flowchart illustrating steps of a method of forming the DEF tank of FIGS. 1A-9.

FIG. 10 is a flowchart 1000 illustrating steps of a method of forming a DEF tank 102 of FIGS. 1A-9. Step 1002 includes forming a tank body 200 configured to store diesel exhaust fluid. The tank body 200 includes a top wall 300, a bottom wall 302, and at least one sidewall 304 therebetween. The tank body 200 defines a tank interior 216 and a tank exterior 308. Step 1004 includes forming a fill port 202 at or proximate to the top wall 300 of the tank body 200. The fill port 202 is in fluid communication with the tank interior 306 of the tank body 200.

Step 1006 includes mounting a tank supply line 108 to the tank body 200 to extend from the tank interior 306 to the tank exterior 308. The tank supply line 108 includes a tank supply port 110 at or proximate to the top wall 300 of the tank body 200. The tank supply port 110 includes a supply connection interface 406 configured to connect to a pump supply line 120 to deliver the diesel exhaust fluid to an SCR device 106. The tank supply line 108 includes a supply inlet 404 at or proximate to the bottom wall 302 of the tank body 200. In certain embodiments the method further includes mounting a tank return line 112 to the tank body 200 to extend from the tank interior 306 to the tank exterior 308. The tank return line 112 includes a tank return port 114 at or proximate to the top wall 300 of the tank body 200. The tank return port 114 includes a return connection interface 410 configured to connect to a pump return line 122 for returning the diesel exhaust fluid undelivered to the SCR device 106.

Step 1008 includes mounting a tank siphon line 116 to the tank body 200 to extend from the tank interior 306 to the tank exterior 308. The tank siphon line 116 includes a tank siphon port 118 at or proximate to the top wall 300 of the tank body 200. The tank siphon port 118 includes a siphon connection interface 500. The tank siphon line 116 is configured to drain the diesel exhaust fluid from the tank body 200. The tank siphon line 116 includes a siphon inlet 502 at or proximate to the bottom wall 302 of the tank body 200. In certain embodiments, the tank siphon line 116 in a draining configuration is configured to drain the diesel exhaust fluid from the tank body 200, and in a delivery configuration is configured to connect to a pump return line 122 for returning the diesel exhaust fluid undelivered to the SCR device 106. In certain embodiments, the siphon connection interface 500 has a same configuration as the supply connection interface 406 for interchangeable attachment of the pump supply line 120.

In certain embodiments, the method further includes positioning an internal filter 402 within the tank interior 306 of the tank body 200. The internal filter 402 is in fluid communication with the tank supply line 108. The tank siphon line 116 is devoid of a filter. In certain embodiments, the method further includes forming a flow port 208 at or proximate to the top wall 300 of the tank body 200. The flow port 208 in fluid communication with the tank interior 306 of the tank body 200. In certain embodiments, the method further includes forming a sending unit 206, 700, 900. The sending unit 206, 700, 900 includes a sending interface 400 configured to removably attach to the flow port 208, the tank supply line 108 permanently mounted to and extending through the sending interface 400, the tank siphon line 116 permanently mounted to and extending through the sending interface 400, and the internal filter 402 permanently attached to the tank supply line 108. The method further includes attaching the sending unit 206 to the flow port 208.

Those skilled in the art will recognize improvements and modifications to the preferred embodiments of the present disclosure. All such improvements and modifications are considered within the scope of the concepts disclosed herein and the claims that follow.

What is claimed is:

1. A diesel exhaust fluid tank, comprising:
a tank body configured to store diesel exhaust fluid, the tank body comprising a top wall, a bottom wall, and at least one sidewall therebetween, the tank body defining a tank interior and a tank exterior;
a fill port at or proximate to the top wall of the tank body, the fill port in fluid communication with the tank interior of the tank body;
a tank supply line mounted to the tank body and extending from the tank interior to the tank exterior, the tank supply line comprising a tank supply port at or proximate to the top wall of the tank body, the tank supply port comprising a supply connection interface configured to connect to a pump supply line to deliver the diesel exhaust fluid to a Selective Catalytic Reduction (SCR) device, the tank supply line including a supply inlet at or proximate to the bottom wall of the tank body; and
a tank siphon line mounted to the tank body and extending from the tank interior to the tank exterior, the tank siphon line comprising a tank siphon port at or proximate to the top wall of the tank body, the tank siphon port comprising a siphon connection interface, the tank siphon line configured to drain the diesel exhaust fluid from the tank body, the tank siphon line including a siphon inlet at or proximate to the bottom wall of the tank body, the tank siphon line devoid of a filter.

2. The diesel exhaust fluid tank of claim 1, wherein the tank siphon line in a draining configuration is configured to drain the diesel exhaust fluid from the tank body, and in a delivery configuration is configured to connect to a pump return line for returning the diesel exhaust fluid undelivered to the SCR device.

3. The diesel exhaust fluid tank of claim 1, further comprising a tank return line mounted to the tank body and extending from the tank interior to the tank exterior, the tank return line comprising a tank return port at or proximate to the top wall of the tank body, the tank return port comprising a return connection interface configured to connect to a pump return line for returning the diesel exhaust fluid undelivered to the SCR device.

4. The diesel exhaust fluid tank of claim 1, wherein the siphon connection interface has a same configuration as the supply connection interface for interchangeable attachment of the pump supply line.

5. The diesel exhaust fluid tank of claim 1, wherein the tank siphon line is devoid of a valve.

6. The diesel exhaust fluid tank of claim 1, further comprising an internal filter positioned within the tank interior of the tank body, the internal filter in fluid communication with the tank supply line.

7. The diesel exhaust fluid tank of claim 6, further comprising:
a flow port at or proximate to the top wall of the tank body, the flow port in fluid communication with the tank interior of the tank body; and
a sending unit comprising:
a sending interface configured to removably attach to the flow port;
the tank supply line mounted to and extending through the sending interface; and
the internal filter attached to the tank supply line.

8. The diesel exhaust fluid tank of claim 7, wherein the sending unit further comprises the tank siphon line mounted to and extending through the sending interface.

9. The diesel exhaust fluid tank of claim 1, wherein the tank siphon line is mounted to the tank body and extends through the top wall or the at least one sidewall of the tank body.

10. The diesel exhaust fluid tank of claim 1, wherein the tank body is devoid of a drain plug at or proximate to the bottom wall of the tank body.

11. A vehicle, comprising:
a Selective Catalytic Reduction (SCR) device;
a pump supply line in fluid communication with the SCR device;
a pump return line in fluid communication with the pump supply line; and
a diesel exhaust fluid tank, comprising:
a tank body configured to store diesel exhaust fluid, the tank body comprising a top wall, a bottom wall, and at least one sidewall therebetween, the tank body defining a tank interior and a tank exterior;

a fill port at or proximate to the top wall of the tank body, the fill port in fluid communication with the tank interior of the tank body;

a tank supply line mounted to the tank body and extending from the tank interior to the tank exterior, the tank supply line comprising a tank supply port at or proximate to the top wall of the tank body, the tank supply port comprising a supply connection interface configured to connect to the pump supply line to deliver the diesel exhaust fluid to the SCR device, the tank supply line including a supply inlet at or proximate to the bottom wall of the tank body; and a tank siphon line mounted to the tank body and extending from the tank interior to the tank exterior, the tank siphon line comprising a tank siphon port at or proximate to the top wall of the tank body, the tank siphon port comprising a siphon connection interface, the tank siphon line configured to drain the diesel exhaust fluid from the tank body, the tank siphon line including a siphon inlet at or proximate to the bottom wall of the tank body, the tank siphon line devoid of a filter.

12. The vehicle of claim 11, wherein the tank siphon line in a draining configuration is configured to drain the diesel exhaust fluid from the tank body, and in a delivery configuration is configured to connect to the pump return line for returning the diesel exhaust fluid undelivered to the SCR device.

13. The vehicle of claim 11, wherein the diesel exhaust fluid tank further comprises a tank return line mounted to the tank body and extending from the tank interior to the tank exterior, the tank return line comprising a tank return port at or proximate to the top wall of the tank body, the tank return port comprising a return connection interface configured to connect to the pump return line for returning the diesel exhaust fluid undelivered to the SCR device.

14. The vehicle of claim 13, wherein:

the pump supply line is configured to be removed from fluid communication with the SCR device and the supply connection interface of the tank body, and configured to be attached to the siphon connection interface and a pump for draining the diesel exhaust fluid from the tank body; and the pump return line is configured to be removed from fluid communication with the SCR device and the return connection interface of the tank body, and configured to be attached to the siphon connection interface and the pump for draining the diesel exhaust fluid from the tank body.

15. A method of forming a diesel exhaust fluid tank, comprising:

forming a tank body configured to store diesel exhaust fluid, the tank body comprising a top wall, a bottom wall, and at least one sidewall therebetween, the tank body defining a tank interior and a tank exterior;

forming a fill port at or proximate to the top wall of the tank body, the fill port in fluid communication with the tank interior of the tank body;

mounting a tank supply line to the tank body to extend from the tank interior to the tank exterior, the tank supply line comprising a tank supply port at or proximate to the top wall of the tank body, the tank supply port comprising a supply connection interface configured to connect to a pump supply line to deliver the diesel exhaust fluid to a Selective Catalytic Reduction (SCR) device, the tank supply line including a supply inlet at or proximate to the bottom wall of the tank body; and mounting a tank siphon line to the tank body to extend from the tank interior to the tank exterior, the tank siphon line comprising a tank siphon port at or proximate to the top wall of the tank body, the tank siphon port comprising a siphon connection interface, the tank siphon line configured to drain the diesel exhaust fluid from the tank body, the tank siphon line including a siphon inlet at or proximate to the bottom wall of the tank body, the tank siphon line devoid of a filter.

16. The method of claim 15, wherein the tank siphon line in a draining configuration is configured to drain the diesel exhaust fluid from the tank body, and in a delivery configuration is configured to connect to a pump return line for returning the diesel exhaust fluid undelivered to the SCR device.

17. The method of claim 15, further comprising mounting a tank return line to the tank body to extend from the tank interior to the tank exterior, the tank return line comprising a tank return port at or proximate to the top wall of the tank body, the tank return port comprising a return connection interface configured to connect to a pump return line for returning the diesel exhaust fluid undelivered to the SCR device.

18. The method of claim 15, wherein the siphon connection interface has a same configuration as the supply connection interface for interchangeable attachment of the pump supply line.

19. The method of claim 15:

further comprising positioning an internal filter within the tank interior of the tank body, the internal filter in fluid communication with the tank supply line.

20. The method of claim 19, further comprising:

forming a flow port at or proximate to the top wall of the tank body, the flow port in fluid communication with the tank interior of the tank body; and forming a sending unit comprising:

a sending interface configured to removably attach to the flow port;

the tank supply line mounted to and extending through the sending interface;

the tank siphon line mounted to and extending through the sending interface; and the internal filter attached to the tank supply line; and attaching the sending unit to the flow port.

\* \* \* \* \*